Patented Oct. 5, 1954

2,691,029

UNITED STATES PATENT OFFICE 2,691,029

STEROID OXIDATION

Arthur R. Hanze and Gunther S. Fonken, Kalamazoo, Mich., assignors to The Upjohn Company, Kalamazoo, Mich., a corporation of Michigan No Drawing. Application February 14, 1952,
Serial No. 271,642

6 Claims. (Cl. 260—397.45)

This invention relates to a novel process for the oxidation of certain 3-hydroxy-steroids to 3-keto-steroids and is more particularly concerned with a novel process for the production of certain 21 - acyloxy - 17α-hydroxypregnane-3,11,20-triones.

It is an object of the present invention to provide a novel process for the oxidation of a 21-acyloxy - 3,17α - dihydroxypregnane-11,20-dione in the presence of an acid-binding agent and in tertiary butyl alcohol solvent to produce a 21-acyloxy - 17α - hydroxypregnane - 3,11,20-trione. Other objects of the present invention will be apparent to those skilled in the art to which this invention pertains.

According to the method of the present invention, a 21 - acyloxy - 3,17α-dihydroxypregnane-11,20-dione is reacted with an oxidizing agent selected from the group consisting of N-bromoacetamide and N-bromosuccinimide in tertiary butyl alcohol solvent and in the presence of an acid-binding agent to produce a 21-acyloxy-17α-hydroxypregnane-3,11,20-trione.

The starting compounds of the present invention may be represented by the following generic formula:

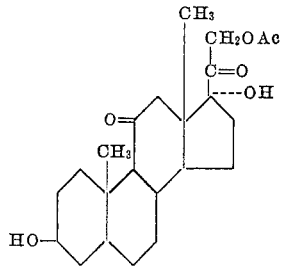

wherein Ac is the acyl radical of a lower-aliphatic monocarboxylic acid containing from one to eight carbon atoms, inclusive, and wherein the 3-hydroxy group has the alpha or beta stereochemical configuration.

These starting 21 - acyloxy-3,17α-dihydroxypregnane-11,20-diones are prepared in the following manner: 21 - acyloxy-3α,17α-dihydroxy-pregnane - 11,20-diones may be prepared from 3α,17α - dihydroxypregnane-11,20-dione [Sarett, J. Am. Chem. Soc. 70, 1454 (1948)] by bromination in the 21-position using bromine in chloroform at about room temperature and subsequent replacement of the 21-bromine atom with an acyloxy group by reaction with the potassium or sodium salt of the selected lower-aliphatic monocarboxylic acid in refluxing acetone. 21-acyloxy-3β,17α-dihydroxypregnane-11,20-diones may be prepared from pregnane - 3,11,20 - trione [Reichstein and Fuchs, Helv. Chim. Acta, 26, 721 (1943)] by reduction of the pregnane-3,11,20-trione with hydrogen in the presence of a Raney nickel catalyst in methanol to give 3β-hydroxypregnane-11,20-dione, which is then treated with acetic anhydride containing para-toluenesulfonic acid to form 3β,20-diacetoxy-17(20)-pregnene-11-one. Treatment of this latter compound with peracetic acid in chloroform followed by saponification with dilute alkali yields 3β,17α-dihydroxypregnane-11,20-dione. Bromination of this compound using bromine in chloroform at about room temperature is productive of bromination in the 21-position and subsequent replacement of the 21-bromine atom by reaction with the potassium or sodium salt of the selected lower-aliphatic mono-carboxylic acid in refluxing acetone gives the desired 21-acyloxy-3β,17α-dihydroxypregnane-11,20-dione [Sarett, J. Am. Chem. Soc. 70, 1454 (1948)].

The oxidizing agent used in the process of the present invention is selected from the group consisting of N-bromoacetamide and N-bromosuccinimide. When following the method of the present invention, by conducting the reaction in tertiary butyl alcohol, these reagents have been found to possess the capacity of effectively oxidizing the 3-hydroxy group of the starting compounds of the present invention to a 3-keto group in yields of about ninety per cent of the theoretical to practically quantitative. Moreover, the product usually crystallizes from the reaction mixture in a state of high purity, thereby eliminating laborious and sometimes difficult separation and purification procedures.

While the theoretical proportion of oxidizing agent to starting steroid for the process of the present invention is one mole to one mole of starting steroid, it is preferred to use an excess, e. g., from about 1.25 to about four moles of oxidizing agent to mole of steroid, although higher or lower ratios are within the scope of the present invention.

The products of the present invention are useful intermediates in the preparation of biologically active compounds such as cortisone and Kendall's Compound "F." Cortisone, for example, may be obtained in two steps by bromination at carbon atom 4 followed by dehydrobromination according to methods well known in the art. The purity of the products of the method of the present invention make them exceptional intermediates for use in preparation of said compounds.

In carrying out the process of the present invention, a 21-acyloxy-3,17α-dihydroxypregnane-11,20-dione is dissolved in tertiary butyl alcohol. This is usually accomplished by gentle warming, whereafter the solution is usually cooled to room temperature and the acid-binding agent and N-bromosuccinimide or N-bromoacetamide then added thereto, usually in that order. The acid-binding agent is present to prevent bromination of the starting steroid or the product of the reaction. Compounds which are advantageously employed for this purpose include pyridine, toluidine, quinoline, N-dimethylaniline, collidine, picoline, and others, with pyridine being preferred. The reaction mixture is then allowed to stand for about one to about two days. The length of time required for complete reaction may be determined by the titration of the unreacted oxidizing agent in aliquot samples taken from time to time from the reaction mixture. While it is advantageous to conduct the reaction at room temperature, temperatures of from about fifteen to about fifty degrees centigrade are operative, with the time of reaction being somewhat inversely proportional to the temperature employed and the amount of oxidizing agent used. By the time the theoretical amount of oxidizing agent has been consumed, precipitation of the crystalline product has usually commenced. The rate of crystallization may be accelerated by the addition of about two or three volumes of water and by cooling the reaction mixture, as in a refrigerator.

The thus-produced 21 - acyloxy-17α-hydroxypregnane-3,11,20-trione may be filtered and dried and is obtained in high yield and in a state of high purity. However, if so desired, the product may be recrystallized from a suitable solvent system such as, for example, isopropanol and water.

The following examples are illustrative of the process of the present invention but are not to be construed as limiting.

*Example 1.—21 - acetoxy-17α-hydroxypregnane-3,11,20-trione*

One gram (2.46 millimoles) of 21-acetoxy-3α,17α-dihydroxypregnane-11,20-dione was dissolved with warming in 48 milliliters of tertiary butyl alcohol. After cooling the solution to room temperature, 1.5 milliliters of pyridine and 678 milligrams (4.92 millimoles) of N-bromoacetamide were added thereto and the reaction mixture allowed to stand at room temperature for 24 hours. Titration of an aliquot sample at the end of this time indicated that the theoretical amount of N-bromoacetamide had reacted. Crystallization of the product had commenced and was accelerated by the addition of 130 milliliters of water, whereafter the reaction mixture was placed in a refrigerator overnight to ensure complete crystallization. The precipitated product was then filtered and dried. The yield of dry 21-acetoxy - 17α - hydroxypregnane - 3,11,20-trione, melting at 226.5–229.5 degrees centigrade, was 0.92 gram, a yield of 93 per cent of the theoretical. Infra-red analysis and paperstrip chromatography confirmed the identity of the product.

*Example 2.—21-acetoxy-17α-hydroxypregnane-3,11,20-trione*

In exactly the same manner as given in Example 1, one gram (2.46 millimoles) of 21-acetoxy-3α,17α-dihydroxypregnane - 11,20 - dione was reacted with 847 milligrams of N-bromosuccinimide (4.92 millimoles) in 48 milliliters of tertiary butyl alcohol and 1.5 milliliters of pyridine at room temperature for eighteen hours. The yield of dry 21-acetoxy-17α-hydroxypregnane-3,11,20-trione, melting at 226.5–230.5 degrees centigrade, was 875 milligrams, a yield of 88 per cent of the theoretical. Infra-red analysis and paperstrip chromatography confirmed the identity of the product and the absence of impurities.

*Example 3.—21-acetoxy-17α-hydroxypregnane-3,11,20-trione*

In the same manner as given in Example 1, 230 milligrams of 21-acetoxy-3β,17α-dihydroxypregnane-11,20-dione was reacted with 150 milligrams of N-bromoacetamide in fifty milliliters of tertiary butyl alcohol and 1.5 milliliters of pyridine at room temperature for twelve hours. The 21-acetoxy - 17α - hydroxypregnane-3,11,20-trione thus-produced melted at 226–228.5 degrees centigrade and had an $[\alpha]_D^{25}$ of plus 95 degrees (chloroform). The infra-red spectrum of the product was identical with that of an authentic sample.

*Example 4.—21-acetoxy-17α-hydroxypregnane-3,11,20-trione*

In the same manner as given in Example 1, 21-acetoxy-17α-hydroxypregnane - 3,11,20-trione is prepared by the reaction of 21-acetoxy-3β,17α-dihydroxypregnane-11,20-dione with N-bromosuccinimide in tertiary butyl alcohol in the presence of picoline.

*Example 5.—21-propionyloxy-17α-hydroxypregnane-3,11,20-trione*

In the same manner as given in Example 1, 21-propionyloxy - 17α - hydroxypregnane - 3,11,20-trione is prepared by the reaction of 21-propionyloxy-3β,17α-dihydroxypregnane - 3,20 - dione with N-bromosuccinimide in tertiary butyl alcohol in the presence of pyridine.

In a similar manner, other 21-acyloxy-17α-hydroxypregnane-3,11,20-triones are prepared by the reaction of the selected 21-acyloxy-3,17α-dihydroxypregnane-11,20-dione with N-bromoacetamide or N-bromosuccinimide in the presence of an acid-binding agent in tertiary butyl alcohol solvent. Such compounds include 21-propionyloxy-17α-hydroxypregnane-3,11,20 - trione, 21-butyryloxy-17α-hydroxypregnane-3,11,20-trione, 21-valeryloxy-17α-hydroxypregnane-3,11,20 - trione, 21-hexanoyloxy-17α-hydroxypregnane - 3,11,20-trione, 21-heptanoyloxy - 17α - hydroxypregnane-3,11,20-trione, 21-octanoyloxy-17α-hydroxypregnane-3,11,20-trione, and others.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of a 21-acyloxy - 17α - hydroxypregnane - 3,11,20-trione which includes: mixing a 21 - acyloxy - 3,17α-dihydroxypregnane - 11,20 - dione wherein the acyloxy group has the formula AcO, Ac being the acyl radical of a lower-aliphatic monocarboxylic acid containing from one to eight carbon atoms, inclusive, with a compound selected from the group consisting of N-bromoacetamine and N-bromosuccinimide, in the presence of an acid-binding agent, in tertiary butyl alcohol solvent, and thereafter separating the thus-produced 21-acyloxy-17α-hydroxypregnane-3,11,20-dione.

2. A process for the production of a 21-acyloxy-17α-hydroxypregnane-3,11,29-trione which includes: mixing a 21-acyloxy-3,17α-dihydroxypregnane-11,20-dione wherein the acyloxy group has the formula AcO, Ac being the acyl radical of a lower-aliphatic mono-carboxylic acid containing from one to eight carbon atoms, inclusive, with a compound selected from the group consisting of N-bromoacetamide and N-bromosuccinimide, in the presence of an acid-binding agent, in tertiary butyl alcohol solvent, continuing the reaction at a temperature between about fifteen degrees centigrade and about fifty degrees centigrade, and thereafter separating the thus-produced 21-acyloxy-17α-hydroxypregnane-3,11,20-trione.

3. A process for the production of 21-acetoxy-17α-hydroxypregnane-3,11,20-trione which includes: mixing 21-acetoxy-3,17α-dihydroxypregnane-11,20-dione with a compound selected from the group consisting of N-bromoacetamide and N-bromosuccinimide, in the presence of an acid-binding agent, in tertiary butyl alcohol solvent, and thereafter separating the thus-produced 21-acetoxy-17α-hydroxypregnane-3,11,20-trione.

4. A process for the production of 21-acetoxy-17α-hydroxypregnane-3,11,20-trione which includes: mixing 21-acetoxy-3,17α-dihydroxypregnane-11,20-dione with a compound selected from the group consisting of N-bromoacetamide and N-bromosuccinimide, in the presence of an acid-binding agent, in tertiary butyl alcohol solvent, continuing the reaction at a temperature between about fifteen degrees centigrade and about fifty degrees centigrade, and thereafter separating the crystalline precipitate of 21-acetoxy-17α-hydroxypregnane-3,11,20-trione.

5. A process for the production of 21-acetoxy-17α-hydroxypregnane-3,11,20-trione which includes: mixing 21-acetoxy-3α,17α-dihydroxypregnane-11,20-dione with a compound selected from the group consisting of N-bromoacetamide and N-bromosuccinimide, in the presence of pyridine, in tertiary butyl alcohol solvent, continuing the reaction at a temperature between about fifteen degrees centigrade and about fifty degrees centigrade, and thereafter separating the crystalline precipitate of 21-acetoxy-17α-hydroxypregnane-3,11,20-trione.

6. A process for the production of 21-acetoxy-17α-hydroxypregnane-3,11,20-trione which includes: mixing 21-acetoxy-3β,17α-dihydroxypregnane-11,20-dione with a compound selected from the group consisting of N-bromoacetamide and N-bromosuccinimide, in the presence of pyridine, in tertiary butyl alcohol solvent, continuing the reaction at a temperature between about fifteen degrees centigrade and about fifty degrees centigrade, and thereafter separating the crystalline precipitate of 21-acetoxy-17α-hydroxypregnane-3,11,20-trione.

References Cited in the file of this patent

UNITED STATES PATENTS

| Number | Name | Date |
|---|---|---|
| 2,569,300 | Fieser | Sept. 25, 1951 |
| 2,571,889 | Jones | Oct. 16, 1951 |